United States Patent [19]

van Lier

[11] 4,282,293

[45] Aug. 4, 1981

[54] SEALS FOR ELECTROCHEMICAL CELLS

[75] Inventor: Johannes A. van Lier, Cleveland, Ohio

[73] Assignee: Union Carbide Corporation, New York, N.Y.

[21] Appl. No.: 162,588

[22] Filed: Jun. 24, 1980

[51] Int. Cl.³ .............................................. H01M 2/08
[52] U.S. Cl. .................................... 429/185; 429/206
[58] Field of Search ................ 429/185, 171, 184, 206

[56] References Cited

U.S. PATENT DOCUMENTS 3,713,896  1/1973  Feldhake .............................. 429/174
3,922,178  11/1975  Winger ............................ 429/167 X

FOREIGN PATENT DOCUMENTS 53-89943  8/1978  Japan .
53-143938  12/1978  Japan .

*Primary Examiner*—Charles F. LeFevour
*Attorney, Agent, or Firm*—Cornelius F. O'Brien

[57] ABSTRACT

An improved seal for alkaline cells comprising a gasket having a coated layer of a polyamide, an epoxy resin, asphalt or a cured epoxy-polyamide resin and a film of a substituted organosilane disposed and compressed between the interface of the cell's cover and the coated gasket of the cell thereby providing a fluid-tight seal therebetween.

10 Claims, No Drawings

SEALS FOR ELECTROCHEMICAL CELLS

FIELD OF THE INVENTION

The invention relates to an improved seal for an electrochemical cell employing a gasket having a coated layer of a polyamide, an epoxy resin, asphalt or a cured epoxy-polyamide resin disposed and compressed between the cell's cover and container and wherein a film of a substituted organosilane is disposed between the cover and coated gasket interface thereby forming a fluid-tight seal therebetween.

BACKGROUND OF THE INVENTION

The ability of alkaline electrolytes to wet a metal surface is one of the major causes of leakage in alkaline galvanic cells. The alkaline electrolyte, by wetting the surface of the metal, can actually "creep" through a sealed metal interface. For this reason elaborate precautions have been made to prevent the electrolyte in an alkaline cell from contacting the interface between a seal and certain metal parts of a seal, such as the metal container and the metal cover of the cell. Typical cell systems where this problem is encountered include silver oxide-zinc cells, nickel-cadmium cells, air-depolarized cells and alkaline manganese dioxide cells. In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be sufficiently resilient and resistant to cold flow under pressure of the seal and maintain these characteristics so as to insure a proper seal during long periods of storage. Materials such as nylon, polypropylene, ethylene-tetrafluoroethylene copolymer (Tefzel) and high density polyethylene have been found to be suitable as gasket materials for most applications.

However, due to the propensity of alkaline electrolytes, such as aqueous potassium hydroxide and sodium hydroxide solutions, to wet metal surfaces, the use of gaskets, such as nylon, has not completely solved the leakage problem. Unfortunately, electrolyte leakage not only depletes the electrolyte solution from the cell but can also cause a corrosive deposit at the cover-container interface that not only affects the cell's appearance but could also cause damage to the device in which the cell is used. In addition, if leakage occurs while the cell is being transported and stored at a retailer's establishment, then the cell becomes unmarketable, resulting in a total loss.

U.S. Pat. No. 3,922,178 discloses a sealing means for alkaline batteries which comprises the use of a polyamide, specifically a fatty polyamide, as a seal or protective coating to prevent alkaline electrolyte from wetting certain surfaces within the cell.

U.S. Pat. No. 3,713,896 discloses an insulating seal for alkaline cells which consists of a layer of cured epoxy-polyamide resin located and compressed between a metallic container and a metallic cover.

It has been observed that electrolyte leakage occurs primarily at the interface of the gasket (appropriately coated or uncoated) and the cover. Although many types of coatings or layers of various materials such as polyamides, epoxy resins, asphalts and cured epoxy-polyamide resins on gaskets have greatly reduced electrolyte leakage at metal-gasket interfaces of alkaline cells, an object of the present invention is to improve the sealing of such cells by disposing a film of a substituted organosilane at the interface of the cover and coated gasket.

It is another object of the present invention to provide a seal for use at the interface of the container and cover of an alkaline cell which comprises a non-conductive gasket coated with a layer of a polyamide, an epoxy resin, asphalt, or a cured epoxy-polyamide resin and wherein a film of silane is disposed and compressed between the interface of the coated gasket and the cover of the cell.

It is another object of the present invention to provide a seal for electrochemical cells which comprises a non-conductive gasket, such as nylon, coated with a layer of a polyamide, such as a fatty polyamide, disposed and squeezed between the interface of the cover, having thereon a film of silane, and the container of the cell.

The foregoing and additional objects will become more fully apparent with the following description.

SUMMARY OF THE INVENTION

The invention relates to a sealed electrochemical cell comprising a cathodic material, an anodic material and an electrolyte housed in a cupped container sealed at its open end by a closure which comprises a cover and a nonconductive gasket having at least one layer of a polyamide, an epoxy resin, asphalt, or a cured epoxy-polyamide resin, said coated gasket disposed and compressed between the interface of the cover and the container, the improvement being a film of a substituted organosilane disposed between the coated gasket and the cover interface thereby forming a fluid-tight seal therebetween.

A suitable substituted organosilane material for use in this invention would be gamma-aminopropyltriethoxysilane having the formula

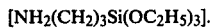

$[NH_2(CH_2)_3Si(OC_2H_5)_3]$.

This amino-substituted organosilane material, gamma-aminopropyltriethoxysilane, is available commercially as Silane A-1100 from Union Carbide Corporation. Other suitable substituted organosilanes are A-186, beta-(3,4-epoxycyclohexyl) ethyltrimethoxysilane, and A-187, gamma-glycidoxypropyltrimethoxysilane, also manufactured by Union Carbide Corporation.

As stated above, it has been observed that any leakage from alkaline sealed cells employing a coated gasket compressed between the cell's cover and container usually occurs at the cover-coated gasket interface. Although the majority of sealed cells produced in any lot will not exhibit or show leakage, it is the random leakage that causes problems that require expensive checking and monitoring systems to prevent their release to the consumer trade. In addition, although some cells may pass rigid checking procedures, it is not until after they are shipped and stored that electrolyte leakage may commence. It is against this background that the present invention is directed which will provide an improved seal for galvanic cells which employ coated gaskets compressed between the cell's container and cover. The coating for the gasket could be a polyamide, an epoxy resin, asphalt or a cured epoxy-polyamide resin with polyamides being the preferred coating. According to the invention, a film of a substituted organosilane is disposed between the coated gasket and the cover thereby improving the seal therebetween which has been found to be the area most susceptible to electrolyte leakage. Preferably, the substituted organosilane should be deposited on the edge surface of the cover that will contact the coated gasket. Since the cover of the cell functions as a terminal member, then it is necessary that the substituted organosilane be substantially confined to that area of the cover that is compressed against the coated gasket. Preferably, the substituted organosilane, such as Silane A-1100, A-186 or A-187, could be dissolved in a solvent, such as trichloroethylene, to form a solution up to about a 2% concentration of the silane and preferably about 0.1% concentration. The silane solution could then be deposited on the sealing edge of the cover, that is, the edge surface which contacts the coated gasket, by any conventional technique followed by drying to allow the solvent to evaporate. The coated cover could then be assembled in a cell in a conventional manner.

Typical polyamides that are suitable for use in this invention are the polyamides formed as condensation products of polyamides and the dibasic acids obtained when certain unsaturated fatty acids are dimerized.

The preferred polyamides are fatty polyamides which are described on pages 597 to 615 in Volume 10 of the "Encyclopedia of Polymer Science and Technology", Interscience Publishers (John Wiley & Sons, Inc.), New York. Briefly, fatty polyamides are produced by reacting a polybasic acid with a polyfunctional amine. Generally the polybasic acids are principally dibasic acids formed by the dimerization of, for instance, a $C_{18}$ unsaturated fatty acid derived from an unsaturated vegetable oil. Such dimers are then reacted with a diamine, such as ethylenediamine, propylenediamine, and the like. Fatty polyamides are available commercially from, for example, General Mills, Inc., Minneapolis, Minn. and/or the Henkel Corporation under the tradename of "VERSALON". The fatty polyamides can be employed in any physical shape or configuration that is appropriate for the particular protective application to be performed. For example, the fatty polyamide can be applied as a coating over the surface to be protected or the fatty polyamide can be employed as a seal, washer or other configuration. U.S. Pat. No. 3,922,178 discloses the use of fatty polyamides and the disclosure so made is incorporated herein by reference.

The use of cured epoxy-polyamide resins is disclosed in U.S. Pat. No. 3,713,896 and such disclosure is incorporated herein by reference. Specifically, the mixtures of epoxy and polyamide suitable for use in this invention could range from 5¾ parts by weight of polyamide to 1 part of epoxy to 1 part polyamide to 3 parts epoxy.

It has been observed that the standard type gaskets, such as nylon, which are highly compressed between the metal container and cover, are fairly rigid materials and thus unable to conform exactly to the surface of the metal. In addition, with the use of fatty polyamides, epoxy resins, asphalt, or cured epoxy-polyamides, an improvement is noted but it is believed that it does not always completely seal the interface of the cover and the coated gasket. It has been found, however, that a film of substituted organosilane disposed between the coated gasket and cover will more effectively seal this interface against electrolyte leakage immediately following cell assembly because the substituted organosilane acts as an adhesion promoter and it is believed that it will serve as a coupling agent between the layer on the gasket and the cover. Thickness of the substituted organosilane film can vary and preferably can be between about 10 to about 100 Å, and more preferably be between about 20 and about 50 Å. Silane films above 15 microns would be undesirable because the adhesion promotion characteristics would be impaired.

The preferred embodiment of this invention would comprise a sealing closure consisting of a nylon gasket having a coating of fatty polyamide applied from a solution of about 50 grams or more of fatty polyamide per liter of a solvent, such as trichloroethylene. The edge of the cover would be coated with a solution of Silane A-1100, A-186 or A-187 in trichloroethylene. The coated gasket would then be compressed between the interface of the coated cover and the container of various size cells in a conventional manner producing an excellent liquid-tight seal at the cover-gasket interface of the cells.

EXAMPLE

Two lots of a plurality of cells were produced, each employing a zinc anode, an electrolyte of an aqueous NaOH or KOH solution, a monovalent silver oxide-containing cathode and a dual separator consisting of a cellulosic barrier film and an electrolyte absorbent layer disposed between the anode and the cathode. Components were assembled in various size button cell housings which were sealed with a conductive cover via a sealing closure disposed and compressed between the interface of the housing and the cover. Cell Lot No. 1 employed a sealing closure of a nylon gasket coated with a fatty polyamide which was applied from a solution of 50 grams of a fatty polyamide to 1 liter of the solvent trichloroethylene. The fatty polyamide employed was Swift's 610 obtained from the Swift Chemical Company.

The sealing means for Cell Lot No. 2 consisted of a same type nylon gasket as in Cell Lot No. 1 coated with the fatty polyamide. However, the sealing edge of the cover was coated with a solution of 2% substituted organosilane and 98% trichloroethylene. The coating on the cover was air-dried, and then the cover and the coated gasket were placed over the cell housing and sealed in a conventional manner. This provided a film of the substituted organosilane between the fatty polyamide coated gasket and the cover. The substituted organosilane employed was Silane A-1100 obtained from Union Carbide Corporation.

Each of the cells in each lot was then stored for 9 months at room temperature and then each of the cells was examined to see if any leakage and/or salting appeared at the interface of the gasket and the container, and/or the interface of the cover and the gasket. On visual observation it was noted whether there was light salting (L) at the negative (interface of the gasket and the cover) and the positive (interface of the container and the gasket) sealing edges. By salting is meant the appearance of a whitish residue at the seal area of the cells. In addition, any liquid appearing at either the positive or negative terminal area was noted. The observations so made are presented in the Table and clearly show that the sealing means in accordance with this invention produces an improvement in providing a liquid-tight seal for alkaline cells at the gasket-cover interface.

While the present invention has been described with reference to many particular details thereof, it is not intended that these details shall be construed as limiting the scope of this invention.

TABLE

OBSERVED LEAKAGE AND/OR SALTING

| CELL SIZE | CELL LOT 1 | | | CELL LOT 2 | | |
|---|---|---|---|---|---|---|
| | Positive Terminal | Negative Terminal | % Total (*) | Positive Terminal | Negative Terminal | % Total (*) |
| *0.310 inch diameter by 0.140 inch high | 0 | 7W | 16% of 45 cells | 0 | 11W | 24% of 45 cells |
| *0.455 inch diameter by 0.165 inch high | 0 | 3L | 6% of 50 cells | 0 | 1W | 2% of 50 cells |
| **0.310 inch diameter by 0.140 inch high | 0 | 3L | 6% of 50 cells | 0 | 0 | 0 (50 cells) |
| **0.374 inch diameter by 0.105 inch high | 0 | 1L | 7% of 15 cells | 0 | 0 | 0 (15 cells) |

*Electrolyte KOH
**Electrolyte NaOH
***% Total = % leakage (W) and/or salting (L) observed at one or more locations on the cells based on the total number of cells.
L = Light Salting
W = Cell is Wet

What is claimed is:

1. A sealed electrochemical cell comprising a cathodic material, an anodic material and an alkaline electrolyte housed in a cupped container sealed at its open end by a closure means, said closure means comprising a cover and a nonconductive gasket having at least one layer selected from the group consisting of a polyamide, an epoxy resin, asphalt and a cured epoxypolyamide resin, said coated gasket disposed and compressed between the interface of the cover and the container; the improvement being a film of a substituted organosilane disposed on the edge surface of the cover between the cover and the coated gasket interface thereby forming a fluid-tight seal therebetween.

2. The sealed electrochemical cell of claim 1 wherein the substituted organosilane film is between about 10 Å to about 100 Å thick.

3. The sealed electrochemical cell of claim 1 wherein the substituted organosilane film is between about 20 Å and about 50 Å thick.

4. The sealed electrochemical cell of claim 1 wherein the substituted organosilane is gamma-aminopropyltriethoxysilane.

5. The sealed electrochemical cell of claim 1 wherein the substituted organosilane is beta-(3,4-epoxycyclohexyl)ethyltrimethoxysilane.

6. The sealed electrochemical cell of claim 1 wherein the substituted organosilane is gamma-glycidoxypropyltrimethoxysilane.

7. The sealed electrochemical cell of claim 1, 2 or 3 wherein the gasket is selected from the group consisting of nylon, polypropylene, ethylene-tetrafluoroethylene copolymer and high density polyethylene and the layer is a polyamide layer.

8. The sealed electrochemical cell of claim 1 wherein the gasket is nylon, the layer is a fatty polyamide and the substituted organisilane is selected from the group consisting of gamma-aminopropyltriethoxysilane, beta-(3,4-epoxycyclohexyl)ethyltrimethoxysilane and gamma-glycidoxypropyltrimethoxysilane.

9. The sealed electrochemical cell of claim 1, 2, 3, or 8 wherein the electrolyte is an aqueous potassium hydroxide or sodium hydroxide solution, the layer is a polyamide and the film of substituted organosilane is selected from the group consisting of gamma-aminopropyltriethoxysilane, beta-(3,4-epoxycyclohexyl)ethyltrimethoxysilane and gamma-glycidoxypropyltrimethoxysilane.

10. The sealed electrochemical cell of claim 1, 2, 3 or 8 wherein the electrolyte is an aqueous potassium hydroxide solution, the gasket is nylon, the layer comprises a fatty polyamide and the substituted organosilane is selected from the group consisting of gamma-aminopropyltriethoxysilane, beta-(3,4-epoxycyclohexyl)ethyltrimethoxysilane and gamma-glycidoxypropyltrimethoxysilane.

* * * * *